United States Patent [19]

Gould

[11] 4,305,195

[45] Dec. 15, 1981

[54] APPARATUS FOR DISASSEMBLING AND ASSEMBLING SKATE WHEELS

[76] Inventor: James J. Gould, 1875 Warren Rd., P.O. Box M1128, Ann Arbor, Mich. 48105

[21] Appl. No.: 147,193

[22] Filed: May 6, 1980

[51] Int. Cl.$^3$ .............................................. B23P 19/02

[52] U.S. Cl. ......................................... 29/251; 29/267

[58] Field of Search ................. 29/267, 251, 219, 238, 29/239, 34 R; 7/158

[56] References Cited

U.S. PATENT DOCUMENTS 1,587,777 6/1926 Juelfs .................................... 29/267

2,336,262 12/1943 Krasberg .............................. 29/251

2,441,756 5/1948 De Swart ......................... 29/267 X

*Primary Examiner*—Robert C. Watson

*Attorney, Agent, or Firm*—Olsen and Stephenson

[57] ABSTRACT

A skate wheel disassembling and assembling apparatus including a frame having a wheel support platform adapted to support a skate wheel in a bearing-removal position, a push-pull member mounted on the frame for back and forth movement along an axial path and provided with a hooked tip at one end for engaging a bearing seated in a skate wheel in the bearing-removal position, and provided at the other end with a pusher heat for reinstalling the bearings in the skate wheel. When a skate wheel is positioned on the wheel support platform in the bearing-removal position, a retracting movement of the push-pull member causes the hooked tip to engage the bearing extracting it from its bearing seat. A wheel guide and support assembly is mounted on the frame for receiving and supporting the unassembled components of the skate wheel and is pivotal to a position where the components are in alignment with the push-pull member. A retracting movement of the push-pull member causes the pusher head to engage and force the bearings into the bearing seats.

7 Claims, 2 Drawing Figures

APPARATUS FOR DISASSEMBLING AND ASSEMBLING SKATE WHEELS

BACKGROUND OF THE INVENTION

The present invention relates to a device for quickly and accurately disassembling and assembling skate wheels.

Roller skating and skate boarding are experiencing renewed popularity, especially among younger people. Many people now prefer to participate directly in sporting activities rather than remain spectators, for participation offers the satisfaction of accomplishment plus the benefits received in the exercise involved with the activity. Skating rinks and skateboard courses provide the environment in which the participants can enjoy their activity and improve their skills. Advances in skate wheel design, especially the use of rubber-like synthetic materials, have increased the performance capabilities of skates and skateboards. The skate wheels manufactured from rubber-like synthetic materials have the desired coefficient of friction to provide the required traction and are tough enough to withstand prolonged use over a variety of surfaces. These skate wheels are equipped with bearing assemblies to provide for smooth and frictionless rotation of the wheels on the spindles on which they are mounted. Because the bearings are prone to collect dust or other foreign particulate matter, they periodically must be removed, cleaned, lubricated and reinstalled in the skate wheel. The bearings must be removed in a manner that will not damage the wheels and must be precisely reinstalled with respect to the axis of rotation of the wheel so that the wheel can rotate smoothly.

It is the general object of this invention, therefore, to provide a skate wheel disassembling and assembling apparatus.

It is another object of the present invention to provide a skate wheel disassembling and assembling apparatus that enables the quick removal of the skate wheel bearings by a direct straight pulling action on the bearing so as to avoid damage to the skate wheels.

It is another object of the invention to provide a skate wheel disassembling and assembling apparatus that provides for the quick and accurate installation of bearings in a skate wheel to insure the proper alignment of the bearings relative to the skate wheel.

SUMMARY OF THE INVENTION

The present invention provides a skate wheel disassembling and assembling apparatus which is manually actuated to quickly remove bearing units from the skate wheel and subsequently reinstall those bearing units back into the skate wheel. The apparatus consists of a frame having a base and a wheel support platform on which a skate wheel can be located in a bearing-removal position. A push-pull member is mounted on the frame for back and forth movement along an axial path and is provided at one end with a replaceable hooked tip that is adapted to grasp a bearing unit in a skate wheel located in the bearing-removal position. The push-pull member is movable along a straight axial path between extended and retracted positions and when moved toward the retracted position it pulls the bearing unit away in a straight path from its bearing seat. Consequently, the bearing units do not bind when they are removed nor is the wheel damaged. The wheel support platform is provided with an offset recess to receive the bearing unit when it is pulled from the skate wheel.

The base frame carries a wheel guide and support assembly that is pivotally movable between a wheel assembly position in direct alignment with the push-pull member and an access position displaced angularly from the wheel assembly position. The wheel guide and support assembly includes a spindle on which the unassembled components of the wheel including the skate wheel and the bearing units are mounted in their proper relative positions. The wheel guide and support assembly then is pivoted to its assembly position in direct alignment with the push-pull member which is provided with a pusher head at its end opposite of the end having the hooked tip. Movement of the push-pull member toward its retracted position causes the pusher head to engage the closest bearing unit and a continued closing movement of the pusher head toward the unassembled components forces the bearing units toward their seats in the skate wheel.

Further objects, features and advantages of the present invention will become apparent from a consideration of the following description, the appended claims, and the accompanying drawing in which:

Figure 1:
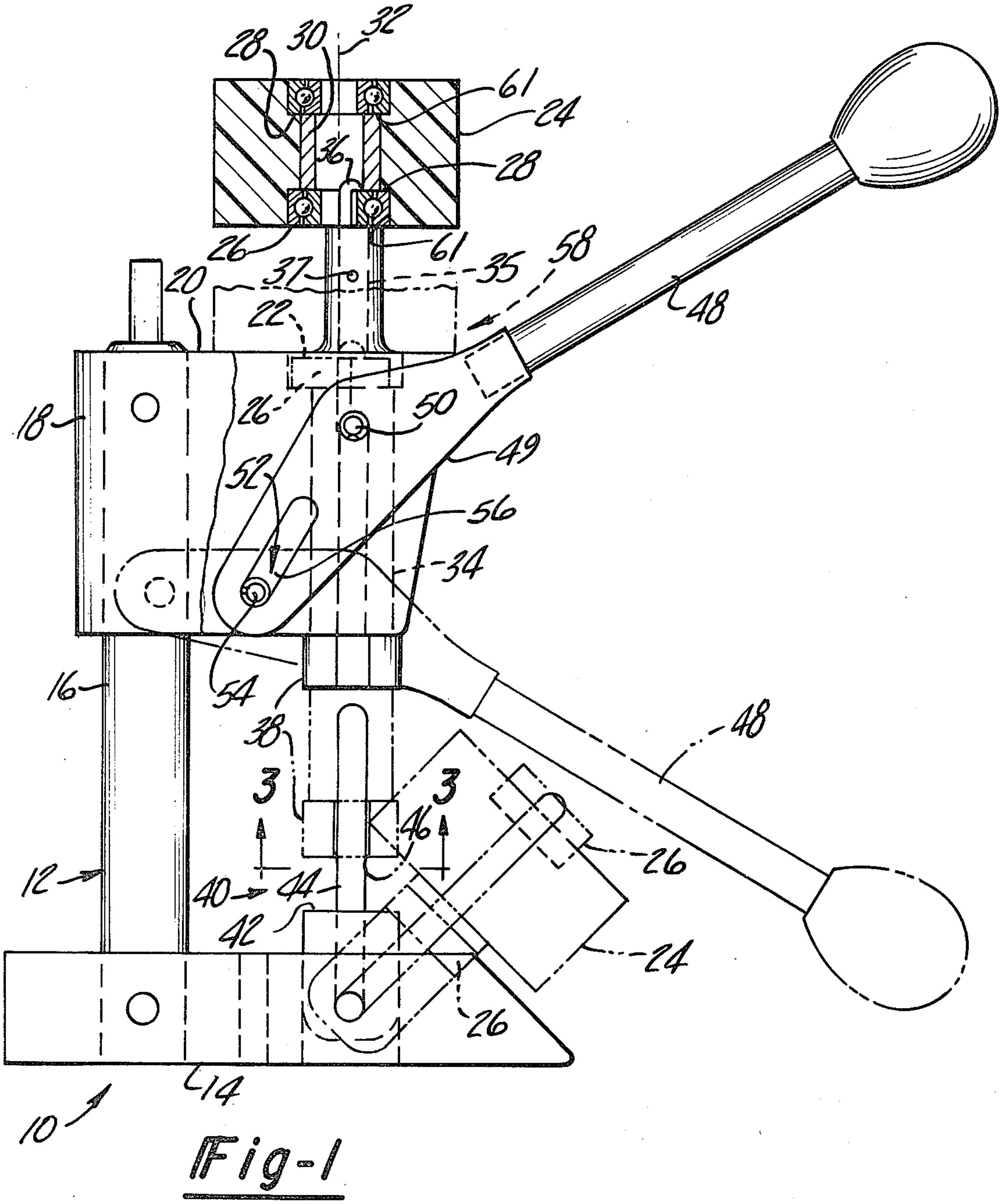
FIG. 1 is an elevational view of the skate wheel disassembling and assembling apparatus of the present invention showing it in two stages of operation.

Referring to the drawing, the skate wheel disassembling and assembling apparatus, indicated generally at 10, is shown in FIG. 1 consisting of a frame 12 that includes a base portion 14 and an upright frame member 16 to which is secured a wheel support platform 18. The wheel support platform 18 has an upwardly facing generally planar surface 20 into which is formed a recess 22. The skate wheel disassembling and assembling apparatus 10 is adapted to remove from a skate wheel 24 the bearing assemblies 26 which are mounted on bearing seats 28 along with a spacer 30 in the form of a hollow tube. The skate wheel 24 has an axis of rotation 32 about which it rotates when it is mounted on a spindle of a skate or skateboard.

A push-pull member 34 is mounted on the wheel support platform 18 for back and forth movement along a straight vertical axial path that is parallel with the axis of rotation 32 of the skate wheel 24. The skate wheel 24 is located in a bearing-removal position on the platform 20, as shown at 58 in broken lines in FIG. 1. The push-pull member 34 has bearing gripper means in the form of an extractor 35 having a hooked tip portion 36 at one end and being readily removable from the upper end of the push-pull member 34. The extractor 35 has a similar hooked tip portion at the opposite end (not shown) which is concealed in the push-pull member 34. A screw 37 secures the extractor 35 to the push-pull member 34 and when loosened allows the extractor 35 to be withdrawn, turned over, and reinserted into the push-pull member 34 so that the other hooked tip portion can be used. The hooked tip portion 36 is adapted to overlie the inner race of the bearing 26 so that when the push-pull member 34 is pulled downwardly toward a retracted position, it engages and removes the bearing unit 26 from the skate wheel 24 through a direct, straight line pulling movement.

The lower or opposite end of the push-pull member 34 is provided with a head 38 having a shoulder 39 (FIG. 2) which is adapted to engage and drive the bearings 26 into their bearing seats 28 in the skate wheels 24. Its operation will be explained in greater detail below.

A wheel guide and support assembly 40 is pivotally mounted on the base portion 14 for movement between a wheel assembly position (straight up and down, in direct alignment with the push-pull member 34 and an access position (shown in broken lines) displaced angularly from the wheel assembly position. The wheel guide and support assembly 40 includes a backup member 42 and a spindle 44. The backup member or anvil 42 and the spindle member 44 are shown in solid lines in the wheel assembly position in which the spindle 44 and the backup member 42 are in direct alignment with the push-pull member 34. The backup member or support block 42 and the spindle 44 are shown in broken line in their access position with the skate wheel 24 and the bearings 26 shown mounted on the spindle 42 in an unassembled relationship. The push-pull member 34 has an axial opening 46 to receive the spindle member 44 when the push-pull member 34 is lowered toward the bearing block 42 in a closing movement.

The push-pull member 34 is moved between an upper extended position and a lowered retracted position by a handle 48 that is connected to a clevis 49 which in turn is pivotally connected to the push-pull member 34 by a pin 50. The clevis 49 is also connected to the frame 12 by a lost-motion pivot connection 52. The lost-motion pivot connection 52 includes a pin 54 fixedly mounted on the platform 18 and positioned in a slot 56 formed in the clevis 49. When the handle 48 is lowered from its upper position to its lower position (shown in broken line), the pin 54 moves in the slot 56 to offset the angular displacement of the handle 48 so that the pin 50 and the push-pull member 34 are moved in a straight up and down path. Thus, as the handle 48 is drawn downwardly, the pins 50 and 54 move toward each other with the slot 56 accommodating the relative movement. The handle 48 is connected to the clevis 49 by screw thread allowing the handle 48 to be readily detached from the clevis 49 for shipping and storing purposes.

In operation, a skate wheel 24 is placed on and supported by the push-pull member 34 as shown in unbroken lines in FIG. 1 wherein the hooked tip 36 overlies the bearing 26. A downward movement of the handle 48 toward its broken-line position will lower the skate wheel 24 onto the surface 20 of the wheel support platform 18 where it will be located in a bearing-removal position as shown in broken lines at 58. The recess 22 is offset with respect to the axis of the path of travel of the push-pull member to receive the bearing 26. This offset position of the recess 22 compensates for the position of the skate wheel 24 when it is held by the hooked tip 36. As seen in FIG. 1, the skate wheel 24 is displaced slightly to the left with the lower bearing 26 being grasped by the hooked tip portion 36. Thus, the bearing 26 is in alignment with the recess 22. A continued downward movement of the handle 48 draws the push-pull member 34 downwardly toward its retracted lowered position to pull the bearing 26 from the bearing seat 28 and into the recess 22. The push-pull member 34 quickly removes the bearing 26 and pulls it from its seat 28 in a straight path so that the bearing 26 will not bind in the skate wheel 24 or damage its bore 61. The handle 48 then is raised and the wheel 24 is turned over for removal of the bearing 26 and from the other side. The bearings 26 can then be cleaned and lubricated.

The skate wheel 24 and the bearings 26 are assembled by mounting them on the spindle 44 when the spindle 44 is in its access position. The wheel 24 and the bearings 26 are placed on the spindle 44 in their proper relative positions, namely, with one bearing 26 on one side of the skate wheel 24 resting on the backup block 42 and the other bearing 26 resting on top of the skate wheel 24. The wheel guide and support assembly 40 then is pivoted from its access position shown in broken line to a generally upright assembly position in which the spindle 44 is in direct vertical alignment with the push-pull member 34. The handle 48 then is pushed downwardly to lower the push-pull member 34. The pusher head 38 engages the upper bearing 26 and squeezes both the upper bearing 26 and the lower bearing 26 into their respective bearing seats 28.

Figure 2:
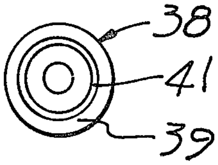
FIG. 2 is an end view of a bearing engaging member in the apparatus of this invention.

As shown in FIG. 2, the head 38 has a shoulder 39 which engages the outer race of the bearing unit 26 and a groove 41 positioned opposite the balls of the bearing unit 26. A similar groove (not shown) is formed in the top surface of the bearing block 42. Accordingly, the balls in the bearings 26 will not be subjected to forces when the skate wheel 24 is reassembled. The spindle 44 is received by the passage 46 as the push-pull member 34 is drawn toward the wheel guide and support assembly 40. After the handle is raised, the wheel guide and support assembly is swung to its access position where the assembled wheel 24 and bearings can be removed.

From the above description, it can be seen that an improved skate wheel disassembling and assembling apparatus is provided which enables the quick removal of bearings from a skate wheel through a direct straight pulling action and which provides for a quick and accurate installation of the bearings back into the skate wheel. The direct straight line withdrawal of bearings from the skate wheel insures that the bearing seats and walls of the skate wheel bore will not be damaged. Use of the wheel guide assembly 40 in reassembling the bearings and skate wheel provides for a positive accurate alignment of the bearings with the wheels. This assures correct positioning of the bearings in the bearing seats so that the skate wheel 24 rotates smoothly without any vibration or chattering. The skate wheel disassembling and assembling apparatus is portable and lightweight and relatively inexpensive.

It is claimed:

1. A wheel assembling and disassembling apparatus for installing bearings in and removing bearings from a wheel having bearing seats and an axis of rotation, said apparatus comprising a frame, a push-pull member mounted on said frame for back and forth movement along an axial path between extended and retracted positions, a wheel support for supporting a wheel in a bearing-removal position in which said axis of rotation is parallel with said axial path, said push-pull member having at one end thereof bearing-gripper means and at the other end thereof a pusher head, a wheel guide assembly pivotally mounted on said frame for movement between an assembly position in general alignment with said push-pull member and an access position displaced angularly from said assembly position, and handle means connected to said push-pull member for moving said push-pull member back and forth along said axial path between said extended and retracted positions whereby said bearing-gripper means is operable to engage a bearing on a bearing seat in a wheel supported on said wheel support in said bearing removal position and in response to movement of said push-pull member to said retracted position to remove said bearing from said wheel, said wheel guide assembly being operable to support an unassembled wheel and bearing in general alignment so that when said wheel assembly guide is located in said assembly position, movement of said push-pull member toward said retracted position causes said pusher head to engage and push said bearing onto said bearing seat in said wheel.

2. Apparatus according to claim 1, wherein said bearing-gripper means comprises a hook portion.

3. Apparatus according to claim 2 and further including means forming a recess in said wheel support for receiving a bearing removed from said wheel.

4. Apparatus according to claim 3, wherein said recess is offset from said axial path.

5. Apparatus according to claim 1, wherein said wheel assembly guide comprises a backup member and a spindle member mounted on said backup member, said backup member and said spindle member pivotally mounted for simultaneous movement between said assembly position in which said spindle in alignment with said push-pull member and said access position in which said spindle member is angularly displaced from said assembly position, said bearing block and said spindle member being operable to receive and hold an unassembled wheel and bearing in alignment in the access position, said backup member and said spindle member being moved to the access position to enable said bearing to be installed in said wheel in response to a closing movement of said pusher head during movement of said push-pull member toward said retracted position.

6. Apparatus according to claim 5, wherein said push-pull member includes a passageway operable to receive said spindle member in said assembly position during movement of said push-pull member toward said retracted position.

7. Apparatus according to claim 1, and further including lost-motion pivot means pivotally connecting said handle to said frame, said lost-motion comprising a fixed pivot on one of said frame and said handle means and slot means on the other of said frame and handle means enabling longitudinal relative movement between said fixed pivot and said slot when said handle means is actuated to move said push-pull member back and forth along said axial path.

* * * * *